(12) United States Patent
Hackert et al.

(10) Patent No.: US 10,980,182 B2
(45) Date of Patent: Apr. 20, 2021

(54) WRAP DELIVERY SYSTEM WITH PIVOTING ROLLER

(71) Applicant: DEERE & COMPANY, Moline, IL (US)

(72) Inventors: Ryan A. Hackert, Ankeny, IA (US); Kevin J. Goering, Cambridge, IA (US); Jeffrey S. Wigdahl, Ames, IA (US)

(73) Assignee: DEERE & COMPANY, Moline, IL (US)

( * ) Notice: Subject to any disclaimer, the term of this patent is extended or adjusted under 35 U.S.C. 154(b) by 157 days.

(21) Appl. No.: 15/991,070

(22) Filed: May 29, 2018

(65) Prior Publication Data

US 2019/0141901 A1 May 16, 2019

Related U.S. Application Data

(60) Provisional application No. 62/585,792, filed on Nov. 14, 2017.

(51) Int. Cl.
*A01F 15/07* (2006.01)
*A01F 15/08* (2006.01)
*A01F 15/18* (2006.01)

(52) U.S. Cl.
CPC ........ *A01F 15/0715* (2013.01); *A01F 15/085* (2013.01); *A01F 15/18* (2013.01); *A01F 2015/0725* (2013.01); *A01F 2015/186* (2013.01)

(58) Field of Classification Search
CPC .... A01F 15/0715; A01F 15/085; A01F 15/18; A01F 2015/0725; A01F 2015/186; B65B 41/16; B65H 16/023; B65H 16/021

USPC ..... 53/118, 587, 389.4, 389.5; 56/28, 40, 42
See application file for complete search history.

(56) References Cited

U.S. PATENT DOCUMENTS

| | | | |
|---|---|---|---|
| 5,129,207 A | 7/1992 | Butler | |
| 5,289,672 A * | 3/1994 | Underhill | A01F 15/0715 53/389.3 |
| 5,692,365 A | 12/1997 | Meyer et al. | |
| 5,729,953 A * | 3/1998 | Fell | A01F 15/0715 53/118 |
| 5,778,644 A * | 7/1998 | Keller | A01D 41/142 56/11.2 |
| 6,050,052 A * | 4/2000 | Herron | A01F 15/0715 53/118 |
| 6,058,688 A * | 5/2000 | Krambeck | A01D 61/008 56/10.2 R |
| 6,543,805 B2 | 4/2003 | McFarland et al. | |

(Continued)

OTHER PUBLICATIONS

How do we pick cotton? (Picking cotton with a John Deere 7760)—published May 14, 2013, retrieved from URL https://www.youtube.com/watch?v=EPFGgThMe-k on Apr. 3, 2020 (Year: 2013).*

(Continued)

*Primary Examiner* — Valentin Neacsu
(74) *Attorney, Agent, or Firm* — Taft Stettinius & Hollister LLP; Stephen F. Rost

(57) ABSTRACT

A module wrapping assembly for a module builder having a first roller rotationally coupled to the module builder about a first axis, a bracket pivotally coupled to the module builder about a bracket axis, and a second roller rotationally coupled to the bracket about a second axis. Wherein, the second axis is offset from the bracket axis. Further wherein, the bracket is pivotable about the bracket axis to reposition the second axis relative to the first axis.

17 Claims, 9 Drawing Sheets

(56) References Cited

U.S. PATENT DOCUMENTS

| | | | |
|---|---|---|---|
| 6,928,792 B1* | 8/2005 | Viesselmann | A01F 15/0715 220/557 |
| 7,946,095 B2* | 5/2011 | Olander | A01F 15/0715 53/118 |
| 10,356,983 B2* | 7/2019 | Simmons | A01F 15/0715 |
| 2005/0086921 A1 | 4/2005 | Bares et al. | |
| 2010/0192516 A1* | 8/2010 | Olander | A01F 15/0715 53/399 |
| 2016/0353664 A1* | 12/2016 | Weber | A01D 43/006 |
| 2016/0353665 A1* | 12/2016 | Hummel | A01F 15/071 |
| 2017/0067495 A1* | 3/2017 | Simmons | F16B 9/023 |
| 2019/0387684 A1* | 12/2019 | Denis | A01F 15/18 |

OTHER PUBLICATIONS

Rollertech three roll builder—applying polyester/ nylon wrapping—published Oct. 14, 2010, retrieved from URL https://www.youtube.com/watch?v=PJxu0Z7jUNI on Apr. 3, 2020 (Year: 2010).*

Carry—Definition by Merriam-Webster Online Dictionary , retrieved from URL https://www.merriam-webster.com/dictionary/carry on Oct. 2, 2020 (Year: 2020).*

On—Definition by Merriam-Webster Online Dictionary , retrieved from URL https://www.merriam-webster.com/dictionary/on , on Feb. 10, 2020 (Year: 2020).*

Roller—Definition by Merriam-Webster Online Dictionary , retrieved from URL https://www.merriam-webster.com/dictionary/roller on Oct. 2, 2020 (Year: 2020).*

Roll—Definition by Merriam-Webster Online Dictionary , retrieved from URL https://www.merriam-webster.com/dictionary/rolls on Oct. 2, 2020 (Year: 2020).*

Bias—Definition by Merriam-Webster Online Dictionary , retrieved from URL https://www.merriam-webster.com/dictionary/bias on Oct. 2, 2020 (Year: 2020).*

By—Definition by Merriam-Webster Online Dictionary , retrieved from URL https://www.merriam-webster.com/dictionary/by on Oct. 2, 2020 (Year: 2020).*

* cited by examiner

WRAP DELIVERY SYSTEM WITH PIVOTING ROLLER

FIELD OF THE DISCLOSURE

The present disclosure relates to a wrap delivery system for a round module builder, and in particular, to a wrap delivery system with a pivoting roller.

BACKGROUND OF THE DISCLOSURE

Round module builders or balers use belts and rollers to manipulate harvested material into a desired form. A round hay baler and a round module builder for cotton both typically use belts under tension running on a series of rollers to compact the harvested material into a cylindrical shape. The belts travel along the rollers to generate a forming chamber wherein the harvested material is collected and formed into the desired shape and density. Once the harvested material is formed to the desired size, a wrap delivery system delivers a wrap material into the forming chamber to wrap the module with the wrap material prior to ejecting the module from the forming chamber.

The wrap material is typically distributed from a wrap roll positioned adjacent to the forming chamber. The wrap roll is positioned on rollers and the wrap material is fed through the rollers to ultimately enter the forming chamber. At least one of the rollers is powered at a speed configured to stretch the wrap material as it spans from the rollers to the forming chamber. Often, two rollers are positioned next to one another to pinch the wrap material as it passes there between.

SUMMARY

One embodiment is a module wrapping assembly for a module builder having a first roller rotationally coupled to the module builder about a first axis, a bracket pivotally coupled to the module builder about a bracket axis, and a second roller rotationally coupled to the bracket about a second axis. Wherein, the second axis is offset from the bracket axis. Further wherein, the bracket is pivotable about the bracket axis to reposition the second axis relative to the first axis.

In one example of this embodiment, the first roller is rotationally driven by a drive system. In one aspect of this example, the second roller is rotationally driven by the drive system.

Another example has a carry roller rotationally coupled to the module builder about a carry axis, wherein the carry axis is offset from the first axis to carry a wrap roll there between.

In another example, the second roller pivots about the bracket axis between a first position and a second position. In one aspect of this example, in the first position the second roller is positioned substantially adjacent to the first roller to position a wrap material there between and in the second position the second roller is spaced from the first roller to provide a gap there between. In another aspect of this example, a biasing member is coupled to the bracket to bias the second roller in the first position.

Another example includes a wrap path defined by the first and second rollers and extending to a module forming chamber, wherein the wrap path is configured to direct wrap material from a wrap roll positioned partially on the first roller to the module forming chamber, wherein the wrap path is defined at least partially between the first and second roller. In one aspect of this example, the bracket axis is positioned relative to the second axis to bias the second roller towards the first roller when a stretch force is applied to the wrap material between the second roller and the module forming chamber.

Another embodiment includes a module wrapping assembly with a housing having a first wall and a second wall, a first roller rotationally coupled to the first wall and the second wall about a first roller axis, a first bracket pivotally coupled to the first wall about a bracket axis, a second bracket pivotally coupled to the second wall about the bracket axis, and a second roller rotationally coupled between the first and second bracket about a second roller axis. Wherein, the second roller is pivotable about the bracket axis towards the first roller.

One example of this embodiment includes a carry roller rotationally coupled between the first wall and the second wall about a carry axis, wherein the carry axis is offset from the first roller axis and the first roller and carry roller are configured to carry a wrap roll there between. In one aspect of this example, the first roller has a first diameter and the carry roller has a carry diameter, the carry diameter being less than the first diameter.

Another example includes a module forming chamber, wherein a wrap path is defined partially around the second roller extending towards the module chamber at a wrap path direction. Further wherein, a force applied in the wrap path direction biases the second roller about the bracket axis towards the first roller.

In another example, at least one of the first roller or the second roller is rotationally driven by a drive system.

In another example, the second roller pivots about the bracket axis between a first position and a second position, wherein in the first position the second roller is positioned substantially adjacent to the first roller and in the second position the second roller is spaced from the first roller to provide a gap there between.

Another example includes a biasing member positioned between at least one of the first or second bracket and the corresponding first or second wall and further wherein the second roller pivots about the bracket axis between a first position and a second position, wherein in the first position the second roller is positioned substantially adjacent to the first roller and in the second position the second roller is spaced from the first roller to provide a gap there between, the biasing member providing a biasing force on the second roller towards the first position. One aspect of this example includes a lock assembly coupled to the bracket, wherein the lock assembly selectively locks the second roller in the first position.

Another embodiment includes a module building system with a module chamber having a plurality of belts positioned there around and configured to form a round module, a module wrapping assembly coupled to the module chamber, the module wrapping assembly having a first roller rotationally coupled between a first and a second wall and configured to at least partially support a wrap roll thereon, a second roller rotationally coupled along a second axis, the second roller configured to be spaced from the wrap roll. Wherein the second axis is movable relative to the first roller.

In one example of this embodiment, the first and second roller define a wrap path from the wrap roll to the module chamber, wherein wrap material is pinched between the first and second roller prior to entering the module chamber. In one aspect of this example, the wrap material is stretched between the second roller and the module chamber by a stretch force, wherein the stretch force biases the second roller towards the first roller.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 5b is a sectional view of the drive system of FIG. 5a;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
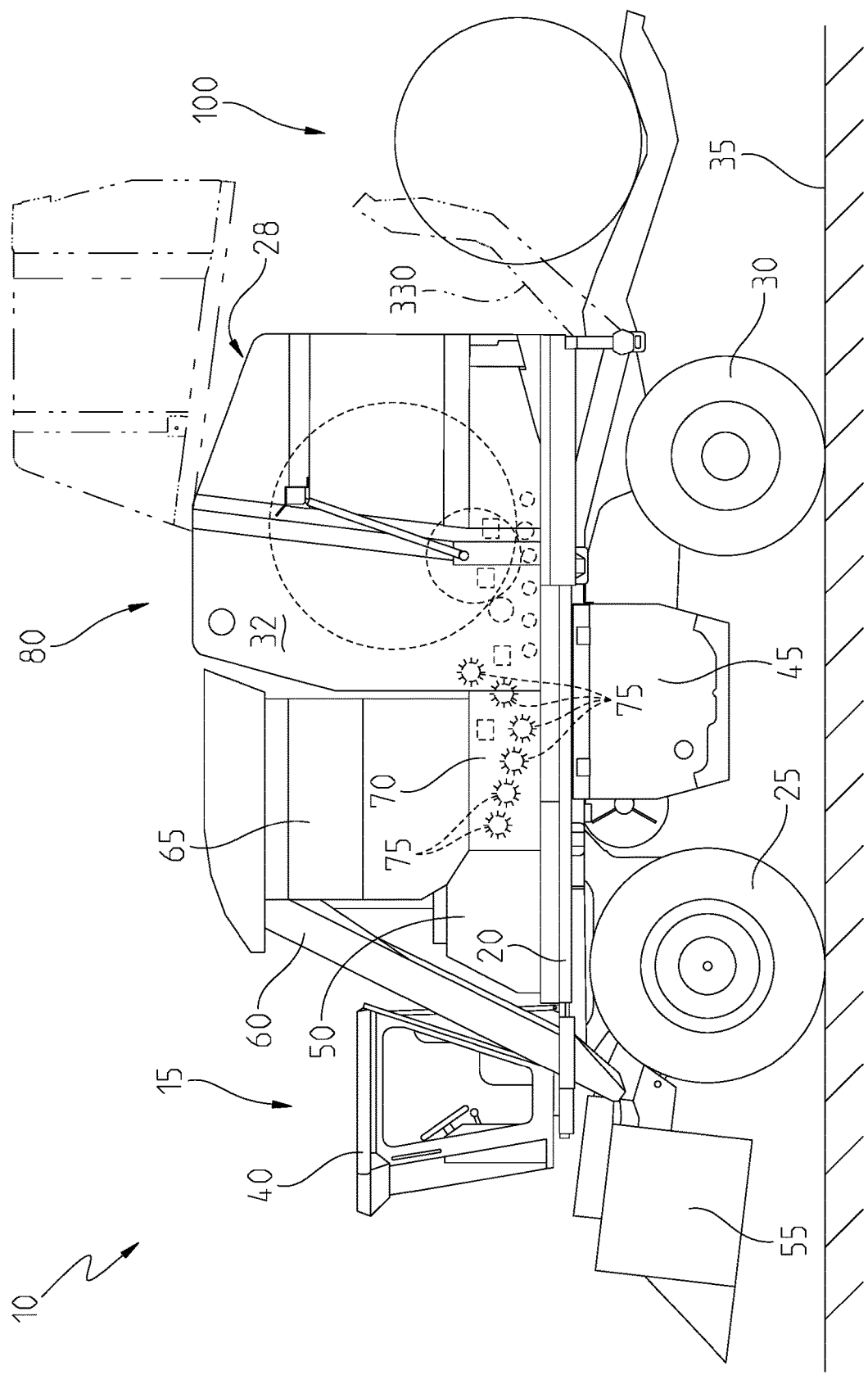
FIG. 1 is a side view of a cotton harvester.

FIG. 1 illustrates a conventional harvester 10 according to one embodiment. The illustrated harvester 10 is a cotton harvester 15. Alternatively, the harvester 10 may be any type of work machine that utilizes a wrapping assembly.

The harvester 10 includes a chassis 20. The chassis 20 is supported by front wheels 25 and rear wheels 30. The harvester 10 is adapted for movement through a field 35 to harvest cotton or other crop. An operator station 40 is supported by the chassis 20. A power module 45 may be supported below the chassis 20. Water, lubricant, and fuel tanks, indicated generally at 50, may be supported on the chassis 20.

A harvesting structure 55 is coupleable to the chassis 20. The illustrated harvesting structure 55 is configured to remove cotton from the field 35. Alternatively, the harvesting structure 55 may be configured to remove other crop. An air duct system 60 is coupleable to the harvesting structure 55. An accumulator 65 is coupleable to the air duct system 60. The accumulator 65 is configured to receive cotton, or other crop, from the harvesting structure 55 via the air duct system 60. A feeder 70 is coupleable to the chassis 20. The feeder 70 is configured to receive cotton, or other crop, from the accumulator 65. The feeder 70 includes a plurality of rollers 75 configured to compress the cotton, or other crop, and transfer the cotton, or other crop, to a round module builder 80. The round module builder 80 has a first wall 28 and a second wall 32.

While a round module builder 80 is shown and described as part of a cotton harvester 15, this disclosure is not limited to such an application of a module builder. More specifically, other embodiments considered for this disclosure include, but are not limited to, a pull type round baler. A pull type round baler may not include a chassis, header, air system, and other components shown on the cotton harvester 15. Rather, the pull behind round baler may have a hitch, wheels, and a crop pickup assembly coupled to the round module builder. A person having skill in the relevant art understands how the teachings of this disclosure can be applied to any round-type baler or module builder and this disclosure is not limited in application to the cotton harvester 15 shown and described herein.

Figure 2:
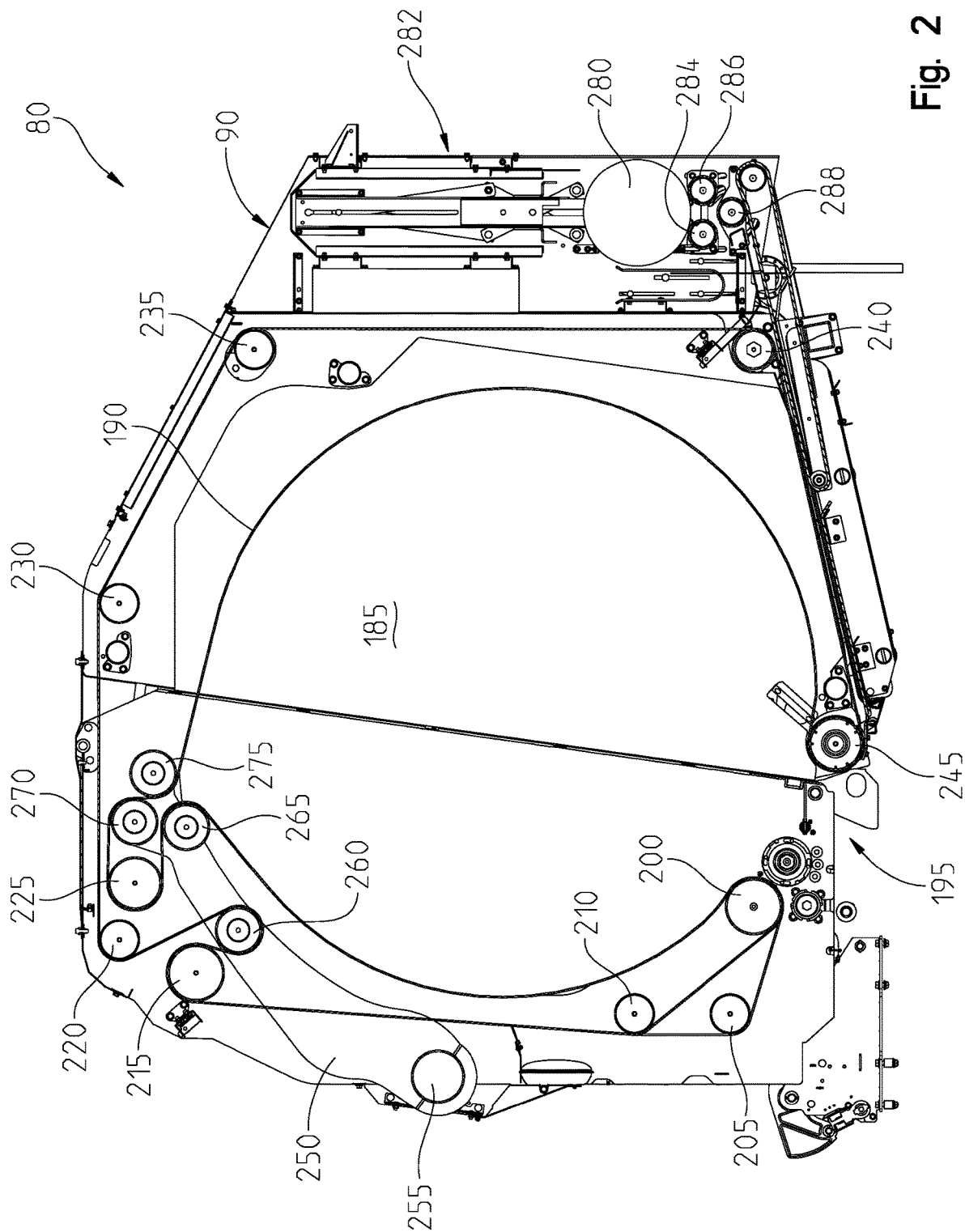
FIG. 2 is a cross-sectional side view of a round module builder.

Referring to FIG. 2, a module-forming chamber 185 may have a plurality of endless belts 190 define the circumference of the module-forming chamber 185. The plurality of endless belts 190 are supported in a side-by-side relationship across a support roll arrangement comprising a plurality of fixed rolls and a plurality of movable rolls. Specifically, proceeding clockwise from a chamber inlet 195 where crop enters the module-forming chamber 185, the fixed rolls include a lower drive roll 200, a first separation roll 205, a second separation roll 210, an upper drive roll 215, an upper front frame roll 220, an upper rear frame roll 225, an upper front gate roll 230, an upper rear gate roll 235, a lower rear gate roll 240, and a lower front gate roll 245 all coupled for rotation within the round module builder 80.

In FIG. 2, a conventional pair of transversely spaced belt tensioning or rockshaft arms 250 are pivotally mounted to a belt tensioning arm pivot 255. The plurality of movable rolls comprise a first movable roll 260, a second movable roll 265, a third movable roll 270, and a fourth movable roll 275, which extend between and have opposite ends, respectively, rotatably coupled to the transversely-spaced belt tensioning arms 250. As illustrated, one or more of the fixed rolls are driven to cause the plurality of endless belts 190 to be driven, with the drive direction being such as to cause the incoming cotton, or other crop, to travel counterclockwise as it is added as a spiral layer to a growing round module 100. As the round module 100 grows within the module-forming chamber 185, the transversely spaced belt tensioning arms 250 rotate counterclockwise until a round module 100 having a predetermined diameter has been formed in the module-forming chamber 185.

Along the rear portion of the round module builder 80 may be a wrapping assembly 90 that houses one or more wrap roll 280. In the embodiment illustrated in FIG. 2, only one wrap roll 280 is shown positioned in the wrapping assembly 90. However, the wrapping assembly 90 is configured to stack multiple wrap rolls 280 on top of one another within a wrap roll hopper 282. The bottom most wrap roll 280 may rest on a front carry roller 284 and a rear carry roller 286. The front and rear carry rollers 284, 286 may be coupled to a bracket (not particularly shown) that allows the front and rear carry rollers 284, 286 to move along a linear path towards, and away from, a lower wrap roller 288.

The wrap roll 280 may be a wrap material sized to cover the exterior circumference of a round module 100. The wrap material may transition from the wrap roll 280, partially around the front carry roller 284, between the front carry roller 284 and the lower wrap roller 288, partially around the lower wrap roller 288 and to the lower front gate roll 245. Once the wrap material enters the module forming chamber 185 at the lower front gate roll 245, the wrap material may follow the endless belts 190 about the circumference of the round module 100 until the outer periphery is substantially covered with wrap material. A cutting assembly (not specifically shown) may then cut the wrap material from the wrap roll 280 and the wrap material may adhere to the round module 100 to substantially maintain its form once ejected from the module forming chamber 185.

In one aspect of the wrapping assembly 90 illustrated in FIG. 2, the wrap material is stretched as it extends between the lower wrap roller 288 and the lower front gate roll 245. More specifically, one or more of the front and rear carry rollers 284, 286 and the lower wrap roller 288 may be powered to feed wrap material from the wrap roll 280 to the module forming chamber 185. Further, the wrap material may be pinched between the front and rear carry rollers 284, 286 and the lower wrap roller 288 as it is fed from the wrap roll 280 to the module forming chamber 185.

The powered roller 284, 286, 288 may send the wrap material toward the lower front gate roll 245 at a feed speed. The feed speed may be slightly less than the speed required to match the rotation speed of the round module 100. In one non-limiting example, the round module may have a twenty-three foot circumference and thereby require approximately twenty-three linear feet of wrap material per rotation. However, the wrapping assembly 90 may only have a feed speed of twenty-two linear feet per rotation. In this embodiment, as the wrap material transitions from the wrap roll 280 to the module forming chamber 185, the wrap material is stretched as it moves between the lower wrap roller 288 and the lower front gate roll 245.

Stretching the wrap material as it transitions from the wrapping assembly 90 to the module forming chamber 185 may provide for a tightly packed round module 100 that has a high density and therefor transports a large amount of harvested crop. Further, the wrap material may compact the round module 100 so that it maintains the proper form. Properly covering the outer surface of the round module 100 may also inhibit moister from penetrating the outer surface of the round module 100. However, if the wrap material is not evenly distributed about the outer surface, the round module 100 may lose form and fall apart or become saturated with water or the like.

In one aspect of the embodiment illustrated in FIG. 2, the lower wrap roller 288 may be rotationally coupled to the round module builder 80 at the first wall 28 and the second wall 32. As the wrap material is stretched between the lower wrap roller 288 and the lower front gate roll 245, the central portion of the lower wrap roller 288 may deflect towards the lower front gate roll 245 responsive to the stretch force applied by the wrap material. This deflection or bowing of the lower wrap roller 288 may cause uneven distribution of the wrap material onto the round module 100. More particularly, the center portion of the wrap material may be tighter than the edge portions as the wrap material is distributed to the surface of the round module 100 or vice versa.

Referring back to FIG. 1, after the round module 100 is formed and wrapped, a module handling system 330 may receive the round module 100. The module handling system 330 temporarily supports the round module 100 and then discharges it from the harvester 10.

In operation, the harvester 10 is driven through the field 35 to harvest cotton or other crop. The illustrated harvesting structure 55 picks cotton from cotton plants in the field 35. Alternatively, the harvesting structure 55 may strip the cotton from the cotton plants. Cotton is transferred to the accumulator 65 via the air duct system 60. The accumulator 65 holds the cotton until a predetermined cotton level is reached and then transfers the cotton to the feeder 70. In an exemplary embodiment, the accumulator 65 transfers cotton to the feeder 70 approximately four times for each round module 100 produced. When the feeder 70 receives cotton, the plurality of rollers 75 are activated to compress the cotton. The compressed cotton is transferred to the round module builder 80.

After the round module builder 80 receives compressed cotton, the plurality of endless belts 190 rotate the cotton into the round module 100. After the round module builder 80 receives sufficient cotton from the feeder 70, the round module may be wrapped and the round module 100 can be ejected onto the module handling system 330. The module handling system 330 supports the round module 100 and then discharges it from the harvester 10. The harvester 10 is adapted for movement through a field 35 to harvest cotton.

Figure 3:
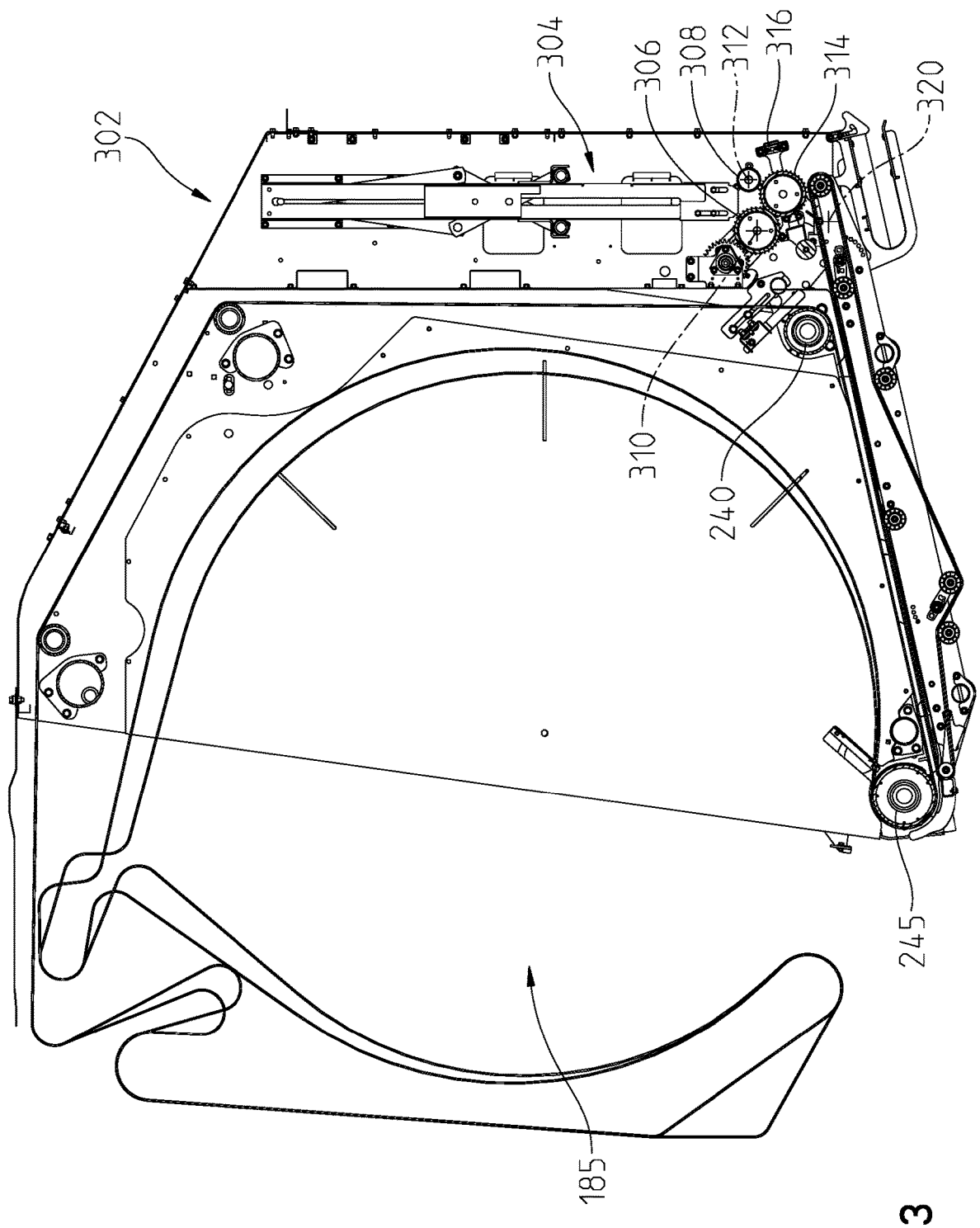
FIG. 3 is a cross-sectional side view of a different embodiment of a wrapping assembly.

Referring now to FIG. 3, a different embodiment of a wrapping assembly 302 is illustrated. More specifically, the wrapping assembly 302 may have a wrap roll hopper 304 similar to the wrap roll hopper 282 described above. The wrap roll hopper 304 may provide storage for a plurality of wrap rolls wherein the bottom-most wrap roll contacts an upper front wrap roller 306 and a carry roller 308. Both the upper front wrap roller 306 and the carry roller 308 may be rotationally coupled to the first and second wall 28, 32 of the round module builder 80. Further, the upper front wrap roller 306 may be rotationally coupled to the first and second side wall 28, 32 about a first axis 310 and the carry roller 308 may be rotationally coupled to the first and second side wall 28, 32 about a carry axis 312. Both the first axis 310 and the carry axis 312 may be defined through a fixed portion of the first and second side wall 28, 32. That is to say, the first axis 310 and the carry axis 312 may not move relative to the first and second side walls 28, 32 or otherwise relative to the round module builder 80.

Figure 6:
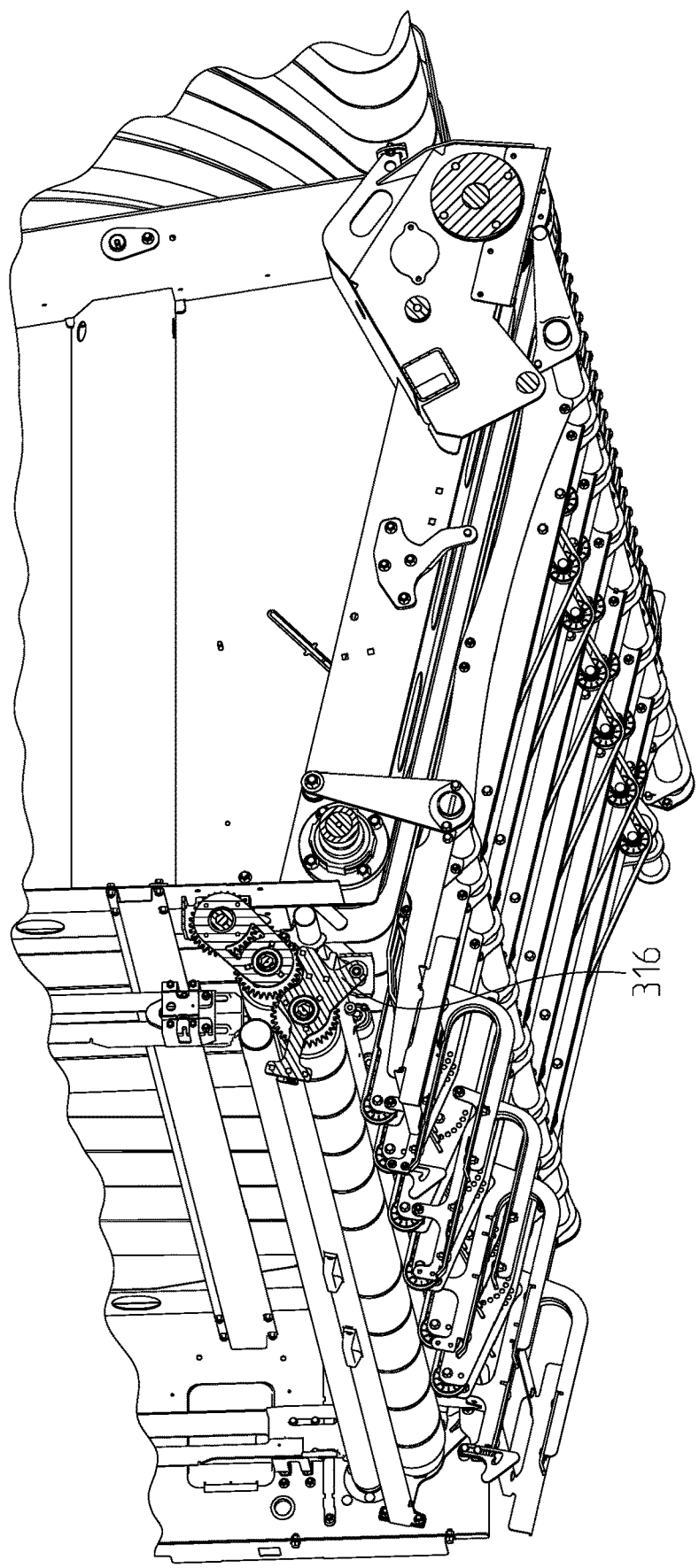
FIG. 6 is a sectional view of the wrapping assembly of FIG. 3.
Figure 7:
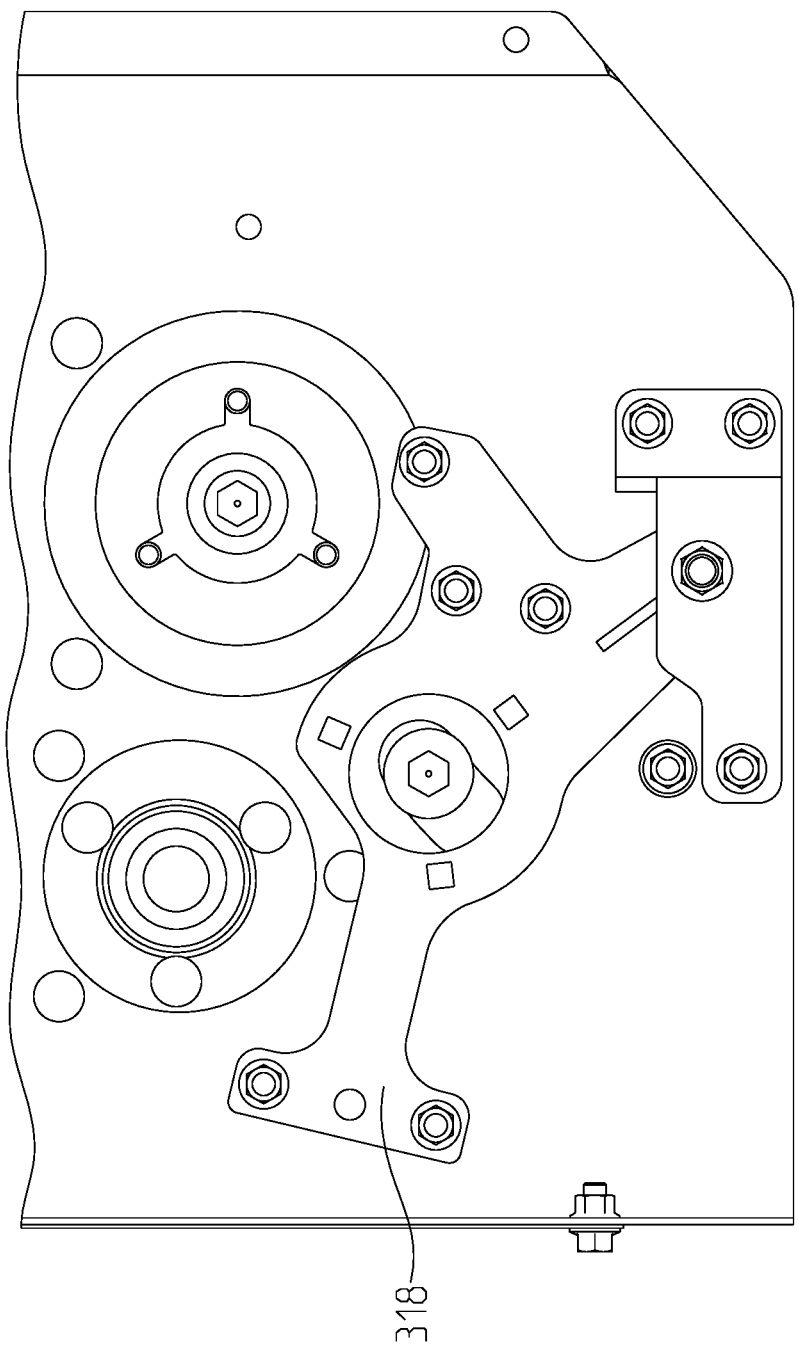
FIG. 7 is another sectional view of the wrapping assembly of FIG. 3.

The wrapping assembly 302 may also have a lower wrap roller 314 that is positionable adjacent to the upper front wrap roller 306. The lower wrap roller 314 may be rotationally coupled between a first bracket 316 (see FIG. 6) and second bracket 318 (see FIG. 7). The first bracket 316 may be pivotally coupled to the first wall 28 about a bracket axis 320 and the second bracket may be pivotally coupled to the second wall 32 about the bracket axis 320.

Figure 4:
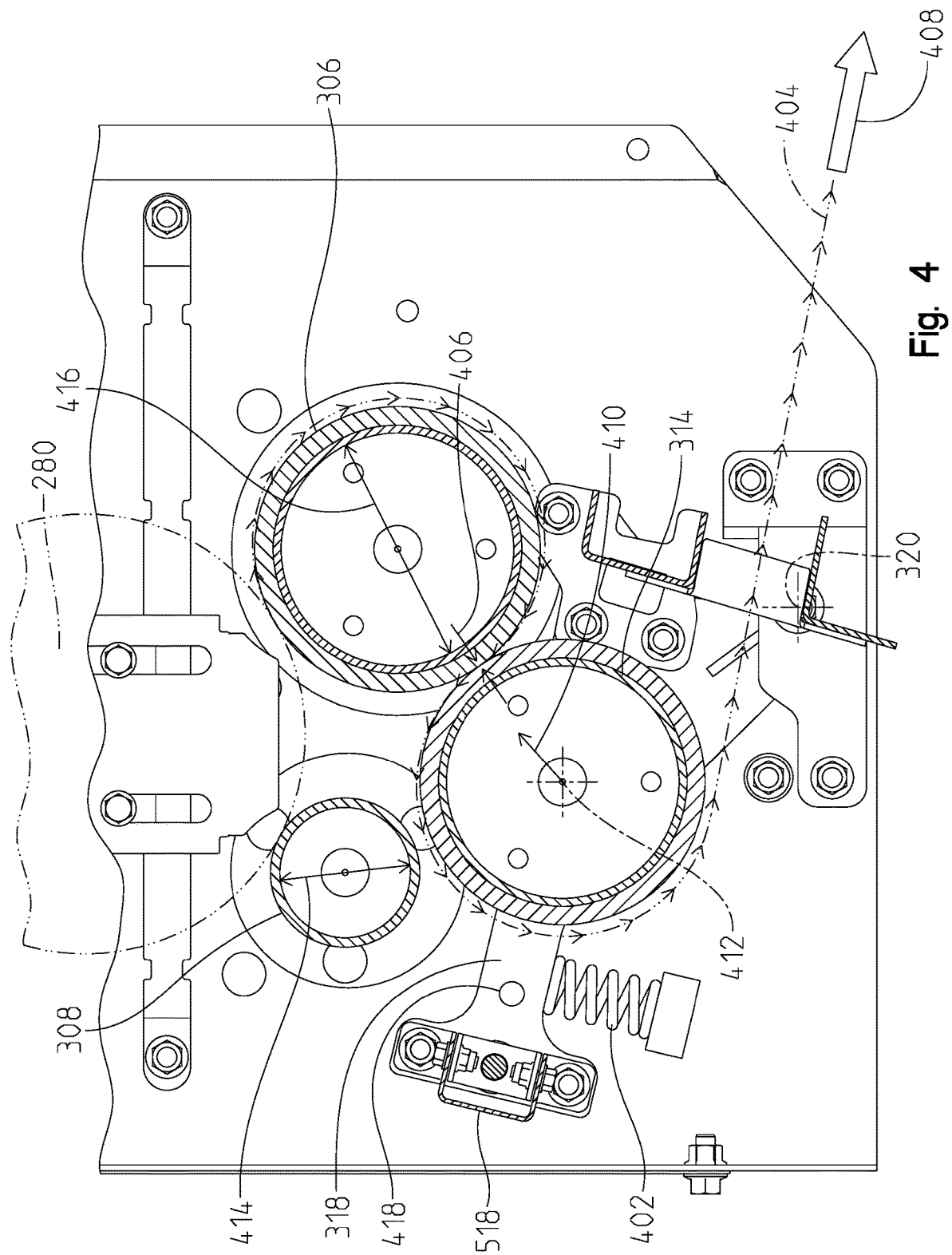
FIG. 4 is a cross-sectional side view of rollers from the wrapping assembly of FIG. 3.

The lower wrap roller 314 may be pivotal about the bracket axis 320 between a first position (as shown in FIG. 3), and a second position. In the first position, the outer surface of the lower wrap roller 314 may be positioned adjacent to the outer surface of the upper front wrap roller 306. More specifically, in the first position the wrap material may be pinched between the upper front wrap roller 306 and the lower wrap roller 314 at a pinch point 406 (see FIG. 4). Pinching the wrap material between the upper front wrap roller 306 and the lower wrap roller 314 allows the rotation speed of the rollers 306, 314 to partially control the feed speed as is described in more detail below.

In one aspect of the embodiment of FIG. 3, the outer surface of the upper front wrap roller 306 and the outer surface of the lower wrap roller 314 may be coated in a material that grips the wrap material such as rubber or the like. The outer surface of the rollers 306, 314 may then control the feed speed of the wrap material to the lower front gate roll 245 without allowing the wrap material to slip there between. In other words, the outer surface of the rollers 306, 314 may frictionally engage the wrap material as it is pinched between the respective rollers 306, 314 at the pinch point 406 and as it travels from the wrap roll to the module forming chamber 185. In this configuration, the stretch force generated on the wrap material between the lower front gate roll 245 and the lower wrap roller 314 may be insufficient to cause the wrap material to slip between the upper front wrap roller 306 and the lower wrap roller 314.

In one embodiment, a biasing member 402 such as a spring or the like may be positioned between the first and second bracket 316, 318 and the corresponding wall 28, 32 to pivot the lower wrap roller 314 about the bracket axis 320 towards the upper front wrap roller 306. The force applied to the brackets 316, 318 by the biasing member 402 may increase the pinch force on the wrap material and thereby reduce the likeliness of the wrap material slipping there between during heavy stretch forces.

The biasing member 402 may be any type of spring or the like known in the art and is not limited to any particular type. More specifically, the biasing member 402 may be generated by any type of mechanical, pneumatic, hydraulic, electrical or the like force. In one non-limiting example, the biasing member 402 is a coil spring. In another example, the biasing member is a hydraulic, pneumatic, or electrical actuator. A person having skill in the relevant art understands the many different types of biasing members 402 that can be utilized to bias a pivoting member about an axis and this disclosure is not limited to any particular one.

Figure 5A:
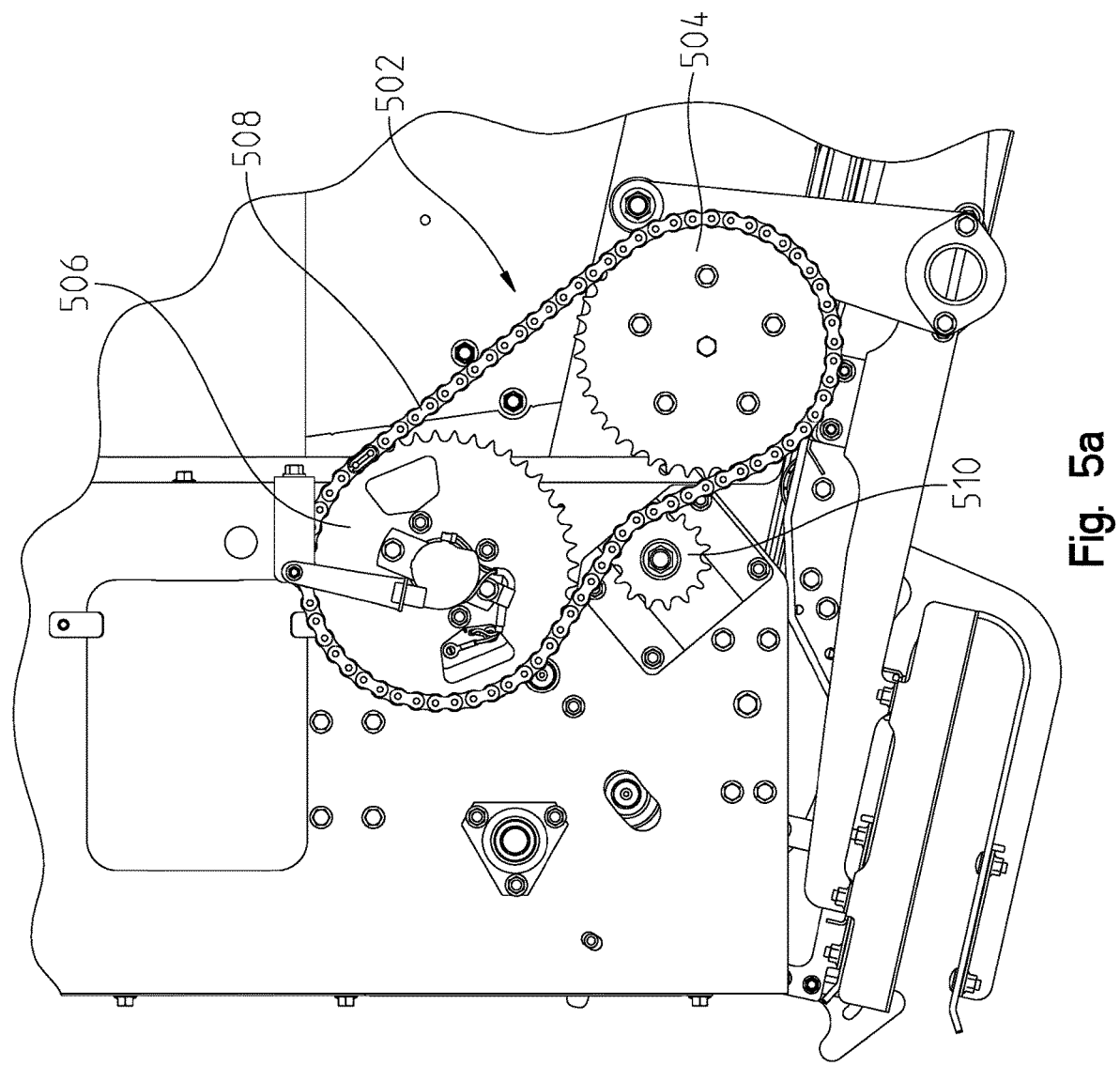
FIG. 5a is partial side view of a roller drive system of the wrapping assembly of FIG. 3.
Figure 5B:
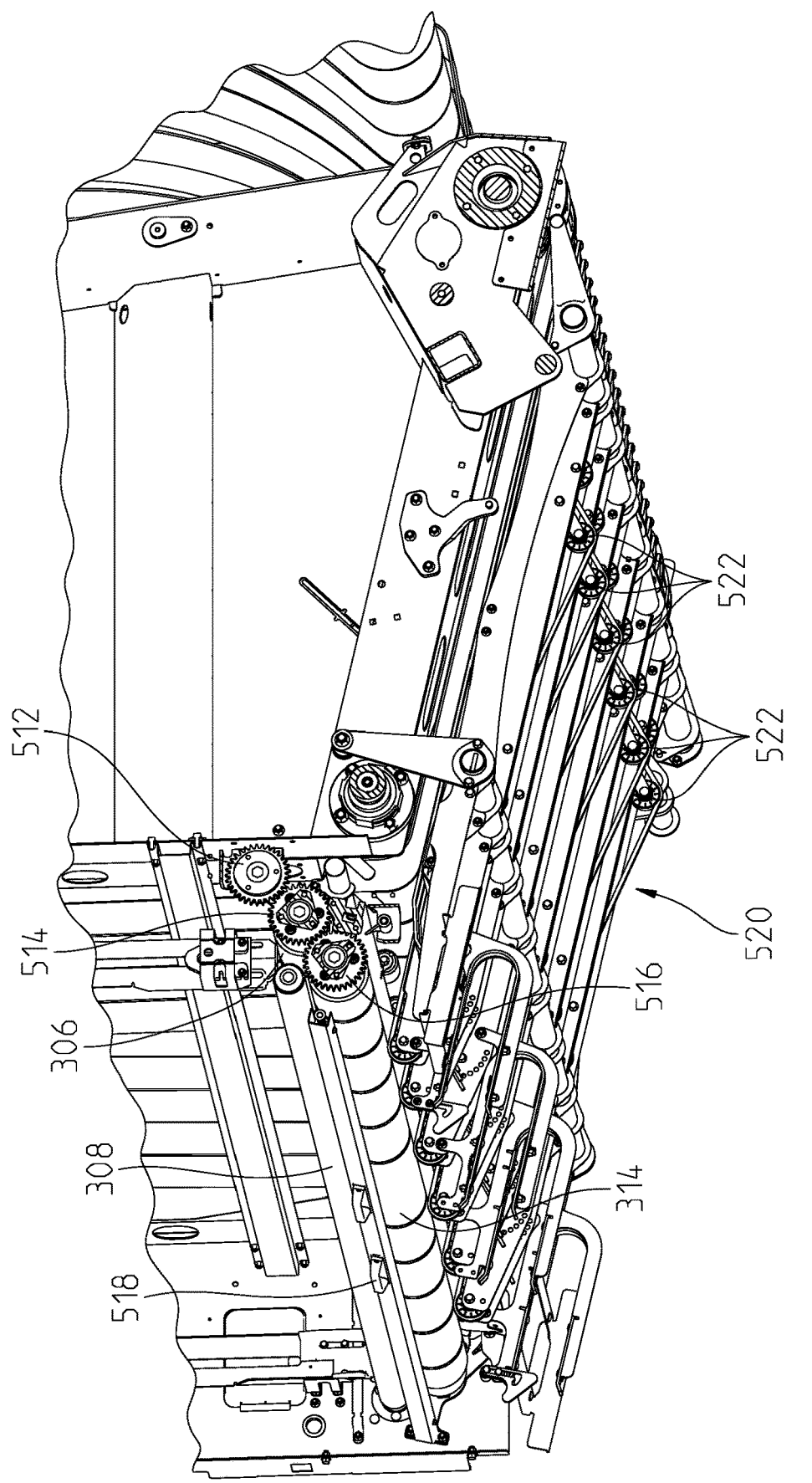

Referring now to FIGS. 5a and 5b, a roller drive system 502 is illustrated. The roller drive system may have a drive sprocket 504 coupled to a driven sprocket 506 via a chain, belt, or the like 508. Further, a tensioner 510 may be positioned partially between the drive and driven sprocket 504, 506 to ensure the proper chain tension is maintained between the sprockets 504, 506. In one non-limiting embodiment, the drive sprocket 504 may be rotationally coupled to the lower rear gate roll 240 or any other roll of the module forming chamber 185. In this embodiment, the ratio of teeth of the sprockets 504, 506 may dictate the feed speed of the wrapping assembly 302 relative to the rotation speed of the rolls of the module forming chamber 185.

The driven sprocket 506 may have a shaft (not particularly shown) coupling the driven sprocket 506 to a drive gear 512 of the roller drive system 502. The drive gear 512 may further be in contact with an upper front wrap gear 514 that is in turn selectively in contact with a lower wrap gear 516. The upper front wrap gear 514 may be coupled to the upper front wrap roller 306 and the lower wrap gear 516 may be coupled to the lower wrap roller 314.

When the rollers 306, 314 are in the first position, the rotational movement of the lower rear gate roll 240 rotates the drive sprocket 504. The rotation of the drive sprocket 504 is transferred to the driven sprocket 506 through the chain 508. From the driven sprocket 506 the shaft rotates the drive gear 512. Finally, the drive gear 512 rotates the corresponding upper front wrap gear 514 and the lower wrap gear 516. However, in one embodiment, when the lower wrap roller 314 is in the second position, the lower wrap gear 516 may not contact the upper front wrap roller gear 514.

While the drive gear 512 is described as powered through a mechanical linkage to the lower rear gate roll 240, the drive gear 512 or the upper front wrap roller 306 and the lower wrap roller 314 may be independently powered. More specifically, hydraulic, pneumatic, electrical, or the like motors may be coupled directly to any one of the abovementioned rollers, gears, or sprockets to provided rotational power thereto. In this embodiment, a controller may communicate with the motor of the respective roller, gear, or sprocket to dictate the feed speed generated by the wrapping assembly 302.

In one aspect of the present embodiment, a handle 518 may be coupled to both the first and second bracket 316, 318. The handle 518 may provide a location for a user to transition the lower wrap roller 314 about the bracket axis 320 between the first and second positions. In one non-limiting example, the user may pull the handle 518 to rotate the lower wrap roller 314 to the second position. In the second position, a gap may be defined between the upper front wrap roller 306 and the lower wrap roller 314 to allow the wrap material to be positioned there between. Once the wrap material is positioned within the gap between the rollers 306, 314, the user may push the handle 518 to transition the rollers 306, 314 into the first position, pinching the wrap material between the outer surfaces of the rollers 306, 314.

One or more of the brackets 316, 318 may have a locking assembly 418 positioned thereon. The locking assembly 418 may be a pin or the like retained within the bracket 316, 318 and positioned to correlate with a through hole of the corresponding wall 28, 32. The locking assembly 418 may selectively lock the brackets 316, 318 and the corresponding lower wrap roller 314 in the first or second position. Accordingly, the user must first remove the pin from the through hole of the wall 28, 32 prior to transitioning between the first and second position. While a pin and through hole are described herein for the locking assembly 418, this disclosure is not limited to such a configuration. Rather, any method of restricting one member from pivoting relative to another is considered herein for the brackets 316, 318.

Another aspect of this embodiment may include a wrap floor 520 positioned partially between the wrapping assembly 302 and the module forming chamber 185. The wrap floor 520 may have a plurality of continuous belts 522 or the like positioned thereon. The wrap belts 522 and the wrap floor 520 may guide the wrap material, in part, from the wrap roll to the lower front gate roll 245 and ultimately into the module forming chamber 185.

The carry roller 308 may not be directly coupled to the roller drive system 502. Rather, the carry roller 308 may be free to rotate as the wrap roll placed thereon rotates. In other words, the carry roller 308 may be an idler roller that supports the wrap roll while simultaneously allowing the wrap roll to rotate as wrap material is fed to the module forming chamber 185. Further, the carry roller 308 may be spaced from the upper front wrap roller 306 to provide a cradle or the like between the rollers 306, 308 to allow the wrap roll to sit thereon. The rollers 306, 308 may maintain the proper positioning of the wrap roll while facilitating rotation as directed by the roller drive system 502.

Referring back to FIG. 4, a wrap path 404 is illustrated. The wrap path 404 may be the path that wrap material will follow as it transitions from the wrap roll 280 to the module forming chamber 185. More specifically, the wrap path 404 may start at the wrap roll 280 and wrap partially around the upper front wrap roller 306 until it is pinched between the upper front wrap roller 306 and the lower wrap roller 314 at the pinch point 406. The wrap path may transition through the pinch point 406 and at least partially around the lower wrap roller 314 and exit the lower wrap roller 314 along the wrap floor 520. The wrap floor 520 may then direct the wrap material to the lower front gate roll 245 where it enters the module forming chamber 185.

As described above, a stretch force 408 may be applied to the wrap material along the wrap path 404 between the lower wrap roller 314 and the lower front gate roll 245. The stretch force 408 may cause a pivoting force 410 to pull the lower wrap roller 314 towards the upper front wrap roller 306. More specifically, the lower wrap roller 314 may be rotationally mounted between the first and second brackets 316, 318 about a lower wrap roller axis 412. The lower wrap roller axis 412; however, is pivotal about the bracket axis 320. Accordingly, when the stretch force 408 is applied to the wrap material on the wrap path 404, the pivoting force 410 is applied to the lower wrap roller 314, thereby further pinching wrap material at the pinch point 406. In other words, increasing the stretch force 408 may also increase a pinching force at the pinch point 406.

In one aspect of this embodiment, the carry roller 308 may have a carry roller diameter 414 and the upper front wrap roller 306 may have an upper roller diameter 416. The carry roller diameter 414 may be less than the upper roller diameter 416 to allow the lower wrap roller 314 to rotate about the bracket axis 320 towards the upper front wrap roller 306. Further, by allowing further rotation about the bracket axis 320, the bending forces acting on the lower wrap roller 314 by the stretch force 408 may at least partially be addressed by the upper front wrap roller 306.

Figure 8:
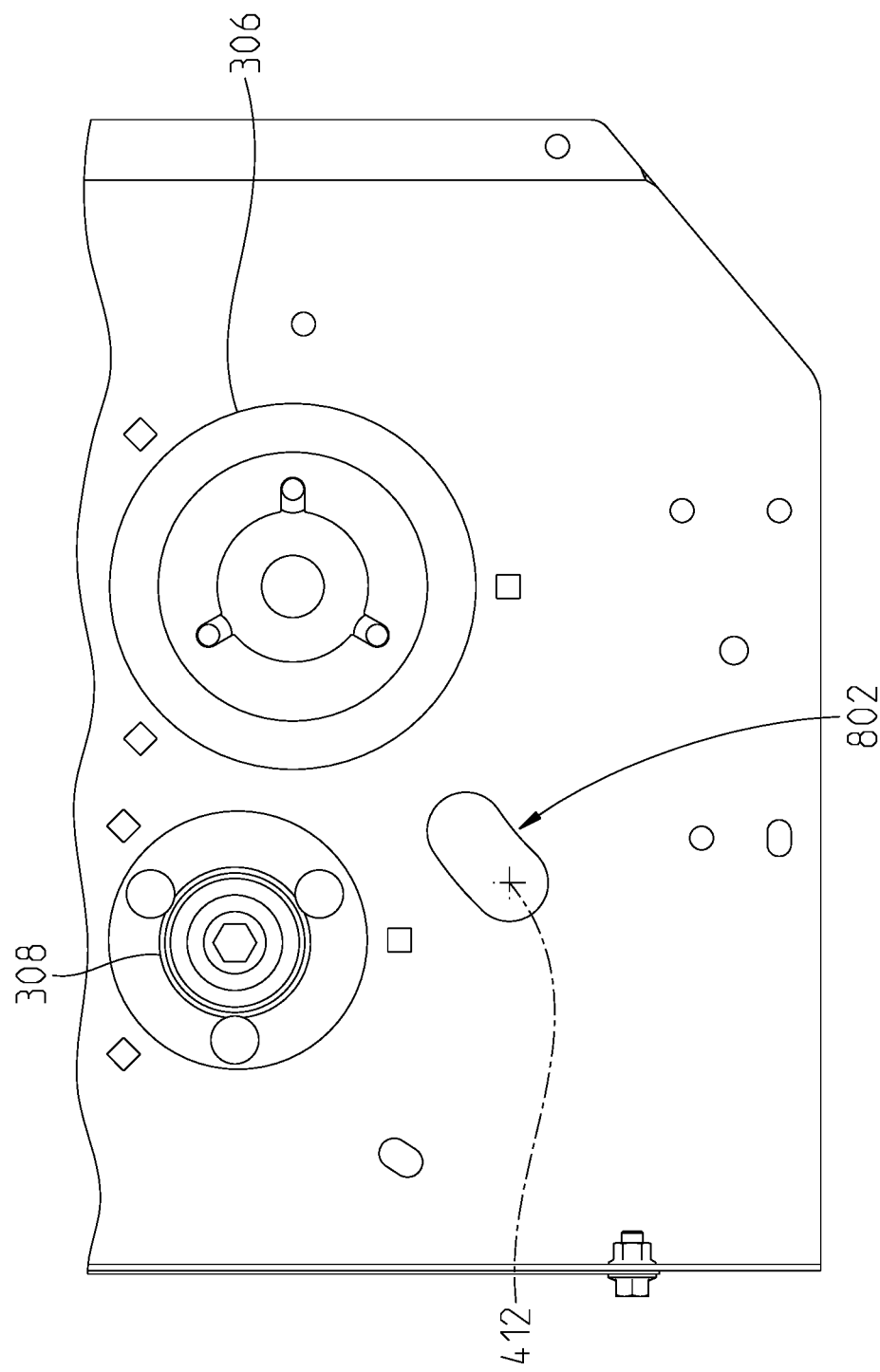
FIG. 8 is a different embodiment of a wrapping assembly.

Referring to FIG. 8, a different embodiment of this disclosure is illustrated. More specifically the lower wrap roller axis 412, and in turn the lower wrap roller 314, may be slidable within a slotted bracket or through hole 802 instead of pivotable via the brackets 316, 318 as described above. In this embodiment, the slotted through hole 802 may be defined through a portion of the first and second wall 28, 32 and may align the lower wrap roller 314 to be pulled towards, or away from, the upper front wrap roller 306 as described above. Accordingly, this embodiment could similarly provide an increased pinch point pressure during increased stretch force as described above albeit through a sliding movement of the lower wrap roller 314 instead of the pivotal movement shown and described above.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A module wrapping assembly for a module builder, comprising:
a first roller rotationally coupled to the module builder about a first axis and configured to directly contact a wrap material;
a bracket pivotally coupled to the module builder about a bracket axis;
a second roller rotationally coupled to the bracket about a second axis and configured to directly contact the wrap material; and
a biasing member coupled to the bracket to bias the second roller towards the first roller;
wherein, the second axis is offset from the bracket axis;
further wherein, the bracket is pivotable about the bracket axis to reposition the second axis relative to the first axis and pinch the wrap material between the first roller and the second roller.

2. The module wrapping assembly of claim 1, further wherein the first roller is rotationally driven by a drive system.

3. The module wrapping assembly of claim 2, further wherein the second roller is rotationally driven by the drive system.

4. The module wrapping assembly of claim 1, further comprising a carry roller rotationally coupled to the module builder about a carry axis, wherein the carry axis is offset from the first axis to carry a wrap roll there between.

5. The module wrapping assembly of claim 1, further wherein the second roller pivots about the bracket axis between a first position and a second position.

6. The module wrapping assembly of claim 5, wherein in the first position the second roller is positioned substantially adjacent to the first roller to position the wrap material there between and in the second position the second roller is spaced from the first roller to provide a gap there between.

7. The wrapping assembly of claim 1, further comprising a wrap path defined by the first and second rollers and extending to a module forming chamber, wherein the wrap path is configured to direct the wrap material from a wrap roll positioned partially on the first roller to the module forming chamber, wherein the wrap path is defined at least partially between the first and second roller.

8. The wrapping assembly of claim 7, further wherein the bracket axis is positioned relative to the second axis to bias the second roller towards the first roller when a stretch force is applied to the wrap material between the second roller and the module forming chamber.

9. A module wrapping assembly, comprising:
a housing having a first wall and a second wall and partially defining a module forming chamber;
a first roller rotationally coupled to the first wall and the second wall about a first roller axis;
a first bracket pivotally coupled to the first wall about a bracket axis;
a second bracket pivotally coupled to the second wall about the bracket axis; and
a second roller rotationally coupled between the first and second bracket about a second roller axis;
wherein, the second roller is pivotable about the bracket axis between a first position and a second position;
wherein, a wrap path for a wrap material is defined partially around the second roller extending towards the module forming chamber at a wrap path direction;
wherein, a force applied in the wrap path direction by the wrap material biases the second roller about the bracket axis towards the first roller;
wherein, in the first position the second roller is positioned substantially adjacent to the first roller and in the second position the second roller is spaced from the first roller to provide a gap there between;
wherein in the first position a surface of the first roller and a surface of the second roller contact wrap material positioned therebetween.

10. The module wrapping assembly of claim 9, further comprising a carry roller rotationally coupled between the first wall and the second wall about a carry axis, wherein the carry axis is offset from the first roller axis and the first roller and carry roller are spaced to carry a wrap roll at least partially thereon.

11. The module wrapping assembly of claim 10, further wherein the first roller has a first diameter and the carry roller has a carry diameter, the carry diameter being less than the first diameter.

12. The module wrapping assembly of claim 9, further wherein the second roller is rotationally driven by a drive system having a sprocket or geared engagement.

13. The module wrapping assembly of claim 9, further comprising a biasing member positioned between at least one of the first or second bracket and the corresponding first or second wall, the biasing member providing a biasing force on the second roller towards the first position.

14. The wrapping assembly of claim 13, further comprising a lock assembly coupled to at least one of the first bracket or the second bracket, wherein the lock assembly selectively locks the second roller in the first position.

15. A module building system, comprising:
- a module chamber having a plurality of belts positioned there around and configured to form a round module; and
- a module wrapping assembly coupled to the module chamber, the module wrapping assembly comprising:
- a first roller rotationally coupled between a first wall and a second wall and configured to directly contact a wrap material and configured to at least partially support a wrap roll thereon;
- a bracket pivotally coupled to the module wrapping assembly about a bracket axis;
- a second roller rotationally coupled to the bracket along a second axis, the second axis being offset from the bracket axis, the second roller configured to directly contact the wrap material and configured to be spaced from the wrap roll; and
- a biasing member coupled to the bracket to bias the second roller towards the first roller;

wherein, the bracket pivots about the bracket axis together with the second axis, moving the second roller relative to the first roller to selectively pinch the wrap material between the first roller and the second roller.

16. The module building system of claim 15, further wherein the first and second roller define a wrap path from the wrap roll to the module chamber, wherein the wrap material is pinched between the first and second roller prior to entering the module chamber.

17. The module building system of claim 16, further wherein the wrap material is stretched between the second roller and the module chamber by a stretch force, wherein the stretch force biases the second roller towards the first roller.

* * * * *